(12) United States Patent
Roth et al.

(10) Patent No.: US 10,931,442 B1
(45) Date of Patent: *Feb. 23, 2021

(54) AUTHENTICATION THROUGH A SECRET HOLDING PROXY

(71) Applicant: Amazon Technologies, Inc., Reno, NV (US)

(72) Inventors: Gregory B. Roth, Seattle, WA (US); Graeme D. Baer, Seattle, WA (US); Nathan R. Fitch, Seattle, WA (US); Eric D. Crahen, Seattle, WA (US); Eric J. Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/152,885

(22) Filed: Oct. 5, 2018

Related U.S. Application Data

(63) Continuation of application No. 13/332,199, filed on Dec. 20, 2011, now Pat. No. 10,103,875.

(51) Int. Cl.
*H04L 9/08* (2006.01)
*H04L 9/06* (2006.01)

(52) U.S. Cl.
CPC .................... *H04L 9/065* (2013.01)

(58) Field of Classification Search
USPC ........ 713/176, 150, 163, 181; 726/2, 21, 36; 380/255, 264, 276
See application file for complete search history.

(56) References Cited

U.S. PATENT DOCUMENTS

| | | | |
|---|---|---|---|
| 6,606,663 B1 * | 8/2003 | Liao .................. | H04W 12/0608 709/229 |
| 6,895,501 B1 * | 5/2005 | Salowey ............... | H04L 63/126 713/168 |
| 7,587,366 B2 * | 9/2009 | Grim, III ............... | G06Q 20/40 705/44 |
| 8,010,679 B2 | 8/2011 | Low et al. | |

(Continued)

FOREIGN PATENT DOCUMENTS

| | | |
|---|---|---|
| EP | 1914959 | 4/2008 |
| WO | 2013049571 | 4/2013 |

OTHER PUBLICATIONS

U.S. Appl. No. 13/312,760, "Stateless and Secure Authentication", U.S. Patent Application, filed Dec. 6, 2011.

(Continued)

*Primary Examiner* — Sharif E Ullah
(74) *Attorney, Agent, or Firm* — Kilpatrick Townsend & Stockton LLP

(57) ABSTRACT

Client requests may be directed through a secret holding proxy system such that the secret holding proxy system may insert a secret into a client request before arriving at the destination. The insertion of a secret may include inserting a digital signature, token or other information that includes a secret or information based upon a secret, which may include secret exchange or authentication protocols. The secret holding proxy system may also remove secrets and/or transform incoming messages such that the client may transparently receive the underlying content of the message.

21 Claims, 7 Drawing Sheets

(56) References Cited

U.S. PATENT DOCUMENTS

| | | | | |
|---|---|---|---|---|
| 8,340,283 | B2* | 12/2012 | Nadalin | H04L 63/0807 380/30 |
| 9,037,511 | B2* | 5/2015 | Roth | H04L 63/08 705/50 |
| 9,607,162 | B2 | 3/2017 | Roth et al. | |
| 2002/0069369 | A1* | 6/2002 | Tremain | H04L 63/0272 726/14 |
| 2004/0174875 | A1* | 9/2004 | Geagan, III | H04N 21/4622 370/389 |
| 2006/0206904 | A1* | 9/2006 | Watkins | G06F 9/45537 719/321 |
| 2007/0171921 | A1* | 7/2007 | Wookey | G06F 9/5027 370/401 |
| 2009/0119504 | A1* | 5/2009 | van Os | H04L 9/3271 713/153 |
| 2009/0282266 | A1* | 11/2009 | Fries | H04L 9/0833 713/193 |
| 2009/0288167 | A1* | 11/2009 | Freericks | G06F 21/566 726/23 |
| 2010/0125856 | A1* | 5/2010 | Dash | G06F 9/541 719/321 |
| 2010/0162235 | A1* | 6/2010 | Ginzton | G06F 9/455 718/1 |
| 2011/0016322 | A1* | 1/2011 | Dean | H04L 63/061 713/171 |
| 2011/0141124 | A1* | 6/2011 | Halls | G06F 21/554 345/522 |
| 2011/0231443 | A1* | 9/2011 | Hannel | H04L 63/20 707/776 |
| 2011/0302042 | A1* | 12/2011 | Hatakeyama | H04M 1/7253 705/26.1 |
| 2011/0302650 | A1* | 12/2011 | Brown | G06F 21/562 726/21 |
| 2012/0196566 | A1* | 8/2012 | Lee | H04W 4/24 455/408 |
| 2012/0310679 | A1 | 12/2012 | Olson et al. | |
| 2013/0006840 | A1* | 1/2013 | Cahn | G06Q 40/04 705/37 |
| 2013/0007459 | A1* | 1/2013 | Godfrey | G06Q 10/107 713/175 |

OTHER PUBLICATIONS

U.S. Appl. No. 13/312,774, "Browser Security Module", U.S. Patent Application, filed Dec. 6, 2011.
U.S. Appl. No. 13/332,199, "Authentication Through a Secret Holding Proxy", U.S. Patent Application, filed Dec. 20, 2011.
U.S. Appl. No. 13/332,199, "Advisory Action", dated Sep. 19, 2014, 4 Pages.
U.S. Appl. No. 13/332,199, "Final Office Action", dated May 6, 2014, 32 pages.
U.S. Appl. No. 13/332,199, "Non-Final Office Action", dated Oct. 1, 2013, 31 pages.
U.S. Appl. No. 13/332,199, "Notice of Allowance", dated May 10, 2018, 13 Pages.

* cited by examiner

AUTHENTICATION THROUGH A SECRET HOLDING PROXY

CROSS-REFERENCE TO RELATED APPLICATIONS

This application is a continuation of U.S. patent application Ser. No. 13/332,199, filed Dec. 20, 2011, now U.S. Pat. No. 10,103,875 issued on Oct. 16, 2018, entitled "AUTHENTICATION THROUGH A SECRET HOLDING PROXY," the full disclosure of which is incorporated herein by reference in its entirety.

BACKGROUND

Properly configuring an operating system to perform secure communications can be difficult. Configuring protocols within the operating system may require configuring a certificate from a certification authority and/or key pairs that form the basis for secure communications. If the operating system or application has not been properly secured the certificate and/or private key may be at risk of loss through server compromise by an intruder. Compromise of a private key causes a loss of trust in the cryptographic benefits of secure communication, as the key may be used by the intruder.

Various attempts have been tried to limit access to keys to prevent key loss. For example, a public key cryptography standard PKCS#11 has been used in a virtual machine to expose cryptographic primitives without exposing the key itself to the guest operating system. However, the solution can be difficult to configure, as different software may have different requirements for using PKCS#11. While various techniques have been employed to effectively minimize the chances of a key loss, due to the complexity of the tasks, the employed techniques are of varied success.

DETAILED DESCRIPTION

Figure 1:
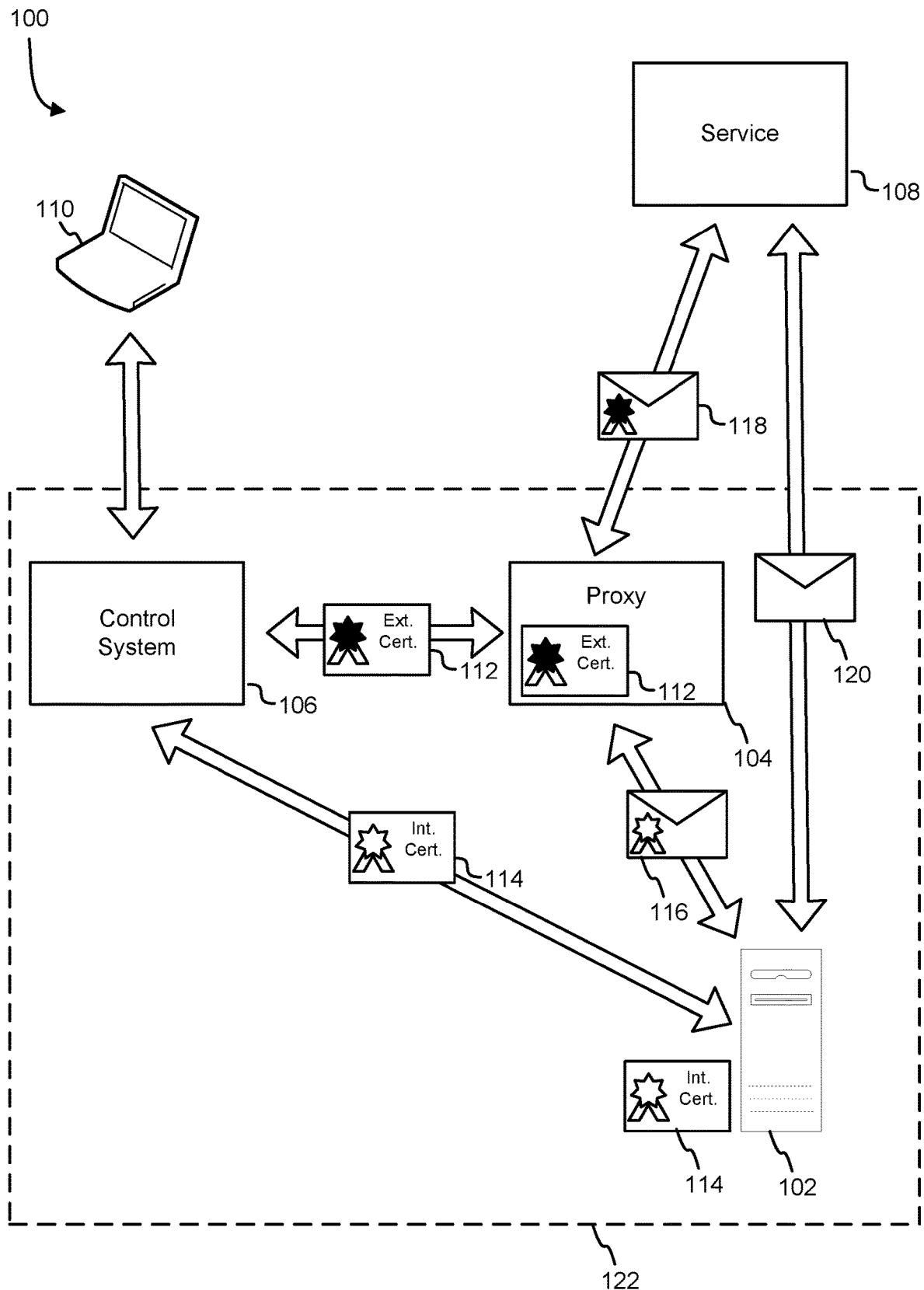
FIG. 1 shows an illustrative example of an environment having a signing proxy in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for directing client requests through a secret holding proxy system such that the secret holding proxy system may insert a secret into a client request before arriving at the destination. The insertion of a secret may include inserting a digital signature, token or other information that includes a secret or information based upon a secret. Inserting a secret into a client request may be used as part of secret exchange and/or authentication protocols. The secret holding proxy system may also remove secrets and/or transform incoming messages such that the client may transparently receive the underlying content of the message. For example, a client server may send a secret holding proxy system a request to sign a message to a service on behalf of the client server. The secret holding proxy system may follow a signature policy, which may ensure the origin of the message is correct and that the client has authorization to use a signature. The secret holding proxy may sign the client request using a recognized credential held by the secret holding system. After the policy has been satisfied, the secret holding proxy system may sign the unsigned message using the recognized credential and send the signed message to a service on behalf of the client. The service may accept the recognized signature from the proxy system. Should the service be sent a message without the proxy signature, the message may be ignored.

In another example, a secret holding proxy system may be a signing proxy system. A client server may sign a message with an interim credential, the message requesting an action from a service, such as a request to clone a database. The message may be intercepted by a signing proxy system. The signing proxy system may follow a signature policy that includes verifying the integrity of the message through the interim signature and the origin of the message as the client server. After the policy has been satisfied, the signing proxy system may sign the message using a recognized credential. The signing proxy system may then send the message with the recognized signature to the service.

Use of this signing proxy system may help reduce and prevent damage from stolen credentials from compromised client machines because the user has administrative control over the proxy system, yet lacks access to the underlying proxy signing system and the credentials within. For example, direct use of either credential may be safely refused by the service, as communications should be through the signing proxy system. Compromise of a client may result in the intruder being able to use the credentials through the compromised system, but the intruder may not be able to request action of a service other than from the client. Communications from other systems may be ignored, as the systems are not the original client. If interim credentials are use, interim credentials may have no meaning outside the context of the proxy. Therefore, addressing the compromise may be accomplished by repairing the compromised client machine. In the case of an interim credential, the signing proxy system and the client system may be configured to use new interim credentials.

Turning now to FIG. 1, an environment 100 of a signing proxy system may be seen. The environment may contain a client system 102, a signing proxy system 104, a control system 106 and a service 108. In one embodiment, a user through a computing system, such as laptop computer 110, may request a control system 106 to prepare a signing proxy system 104 for use with a client 102. For systems that use two secrets, the control system may prepare a recognized secret 112 and interim secret 114. A recognized secret 112 may be useful in identifying a client 102 to one or more external systems. A recognized secret 112 may be the same or similar secret a client would normally use to communicate with an external system. An interim secret 114 may be useful to only identify the client to a signing proxy system 104. The control system may send recognized secret 112 to be stored by the signing proxy system 104. The control system may interim secret 114 to be stored by client 102. Communications from the client 102 to the service 108 may be configured to be redirected through the signing proxy system 102. In some embodiments, communications from the service 108 to the client 102 may also be configured to be redirected through the signing proxy system 104.

Once configured, the client 102 may use the signing proxy system 104 to transparently sign messages on behalf of the client 102. The client may sign a client signed message intended for the service 108. The signing proxy system 104 may intercept the client signed message 116. The signing proxy system 104 may determine whether to sign the client signed message 116 based on a policy. The policy may include verifying the integrity of the client signed message 114 through the signature and the origin of the message as the client 102. If the signing proxy system 104 determines the client signed message 116 may be signed, the signing proxy system 104 may sign the client signed message 116 with recognized secret 112. The proxy signed message 118 may then be sent to the service 108.

The signing proxy system 104 may run on a same physical host as a client 102 or over an isolated network interface, with traffic mapped and routed and strong assurance provided by message encapsulation. If run on the same physical host, the signing proxy system 104 may run in a different process, a kernel module, a different virtual machine on the same hypervisor, or in the hypervisor itself, or any other isolated security context that enables it to protect its secrets.

In another embodiment, instead of a client signed message 116, the client may send an unsigned message to the signing proxy system 104. The signing proxy system 104 may ensure that the policy is satisfied, such as an expected origin of the unsigned message. If the policy is satisfied, the signing proxy service 104 may sign the message with the recognized secret 112 and send the message to the service 108. In some embodiments, unsigned requests are used within a trust boundary 122, where the environment within the trust boundary is administered by a trusted entity, such as proxy machine sharing a trusted network in the context of a data center or a hypervisor supporting the signing proxy system and the client in the context of a virtual machine. A trust boundary may include computing resources, such as network resources and computing systems, that are protected and/or segregated from external computing resources. For example, a service provider may provide a trusted boundary, such as firewalled internal network that is protected from external attack and/or snooping from the Internet. In another example, a trust boundary may exist in a virtualized environment, such as a hypervisor protecting guest operating systems and drivers from undesired external access. In both cases, the communication links are controlled by a trusted entity, and unsigned messages may be reasonably trusted.

The proxy signing system 104 may be used to enforce desired behaviors, while remaining transparent to the client 102. For example, the signing proxy system 104 may initiate secure communications with the service 108, even though the client 102 may not have sent the initial message over a secure communication channel. For example, a signing proxy system 104 may be closely tied to a client 102, such as through a trusted network as trust boundary 122 or as part of a hypervisor. As the client 102 is communicating over a trusted channel, the communication may not need to be secured. However, the signing proxy system 104 may enforce secure communications, such as when the proxy signed message 118 leaves the trusted network 122.

Communications between the client 102 and the service 108 may be done in several different ways. In one embodiment, the signing proxy system 104 may intercept all communications between the client 102 and the service 108. In another embodiment, the signing proxy system 104 may intercept all outgoing communications from the client 102 to the service 108, while incoming communications follow a normal return path. In another embodiment, the signing proxy system 104 may intercept only secure outgoing communications from the client 102 to the service 108, while secure incoming and other insecure communications follow a normal return path. In another embodiment, the signing proxy system 104 intercepts secure communications between the signing proxy system 104 and the client 102. In another embodiment, the signing proxy system 104 may only intercept client signed messages 116, while allowing other messages 120 to pass unaltered. While not every possible communication routing is listed, it should be recognized that the signing proxy system 104 may process messages based at least in part on routing configuration and policy.

The signing proxy system 104 may also receive inbound messages for a client 102 from a service 108. The signing proxy system 104 may receive an inbound signed message on behalf of the client. The signing proxy system 104 may then process the incoming message according to policy, which may include verifying a signature of the service 108, decrypting encrypted communications and/or maintaining a secure connection endpoint on behalf of the client 102. Once processed, if the incoming message satisfies policy requirements, the processed message may be sent to the client. The client may be notified of the policies used to process the incoming message. For example, the client may be notified through injected HTTP headers through an HTTP connection delivering the message.

Figure 2:
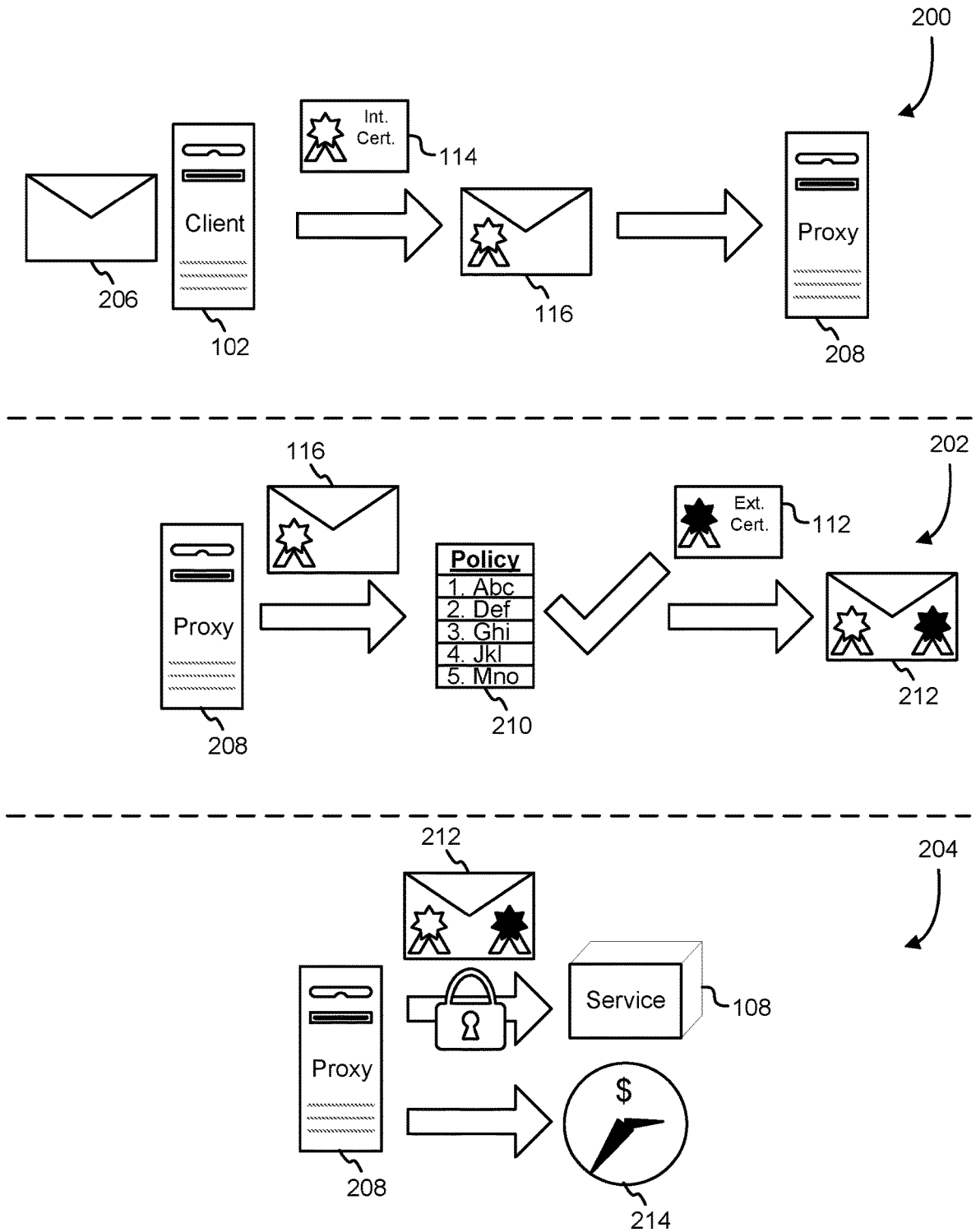
FIG. 2 shows an illustrative example of message flow during use of a signing proxy in accordance with at least one embodiment.

Turning now to FIG. 2, message flow may be seen with the signing proxy system using an interim secret. In FIG. 2, message flow has been divided into three operations, a client sending operation 200, a proxy signing operation 202 and a proxy reporting operation 204. In the client sending operation 200, a client 102 may compose a message 206 to a signing proxy system, such as a proxy server 208. The client 102 may sign the message 206 with an interim secret 114 to make a client signed message 116. The client signed message 116 may be sent to the proxy server 208. In some embodiments, the message is actually sent to service 108, but is intercepted by proxy server 208.

In the proxy signing operation 202, the proxy server 208 may determine if the client signed message 116 will be signed and sent to service 108. The proxy server 208 may review the client signed message 116 using a set of policies 210 set up by an administrator. Policies may include verification of the signature, origin verification (such as IP address verification), time of day, day of week, frequency, service destination and other restrictions and/or verifications. If the proxy server 208 determines that the client signed message 116 is within policy 210 guidelines, the proxy server 208 may sign the client signed message with a recognized secret 112 to form a client and proxy signed message 212.

Signed messages may be composed in different ways. In some embodiments, the proxy server 208 may strip the client signature from the client signed message 116 and insert a recognized signature to form the proxy signed message. For example, a proxy server 208 may delete a client signature information tag and associated content from an XML formatted message and place a proxy signature information tag and computed signature content in the XML formatted message instead. In other embodiments, the proxy server 208 may add a recognized signature on the client signed message 116 to form a client and proxy signed message 212. For example, a proxy server 208 may insert a signature tag and content computed using the recognized secret. In some embodiments, the proxy server 208 may alter the client signature information such that the service 108 may use the proxy signature information, while keeping the client signature intact.

In the proxy reporting operation 204, the proxy may send the client and proxy signed message 212 and report usage. After the signing of the client and proxy signed message 212, the proxy may send the client and proxy signed message 212 to a destination, such as the service 108. The proxy server 208 may modify the message to suit the service 108 and policy requirements. For example, the proxy server 208 may enforce a policy of secure communication between the proxy server 208 and the service 108. The proxy server 208 may use transport layer security (TLS) to send the client and proxy signed message 212 to the service 108. The proxy server 208 may also report usage, to an aggregation and/or billing server 214. By reporting usage, the client owner may be billed for only the amount of services used. In some embodiments, the billing may be based in the number of signed messages sent and/or received. In other embodiments, the billing may be based on use during a period of time. For example, a client owner would only be billed for a month of service if a client used the proxy signing system during that month.

In an environment not using an interim secret, an expected identifier, such as IP address or network connection, may be used instead. For example, the client 102 may send an unsigned message to proxy server 208. The proxy server 208 may verify the origin of the message as client 102 using an expected identifier, confirm satisfaction of any other policies 210 and if satisfied, sign and send the message to the service 108. In some embodiments, verifying the origin may be implicit rather than an explicit check. For example, a TCP/IP connection between machines may use an explicit check to verify origin of any messages between machines. However, use of a driver by a guest operating system to send a message may implicitly be acceptable because the origin is from a known guest operating system using the driver. In other embodiments, the client 102 and proxy server 208 may exist in a trusted boundary 122, such as a trusted network, and no expected identifier is needed.

While a service 108 has been discussed, it should be recognized that a client may send a message to other systems besides services or systems that are associated with services. In one embodiment, a signing proxy system may be used to send messages between systems. For example the signing proxy system may be used to synchronize information between peer systems.

In one embodiment, the signing proxy system may be used to sign requests to a storage service. For example, the client may be an administrative process for a web server. The service may be a storage service. The message may be an API call for expansion of the storage. The administrative process may discover a need for more storage for a web server under its monitoring. The administrative process may create an API message that is required to be digitally signed and send the message signed with the administrative process secret to the storage service. A proxy service may intercept the administratively signed message, determine its authenticity and remove the original signature. If the message passes policy checks, such as the message is authentic, the administrative process is authorized to request an increase in storage, and the administrative process is associated with a financial account for billing, the proxy service may sign the message authorizing the storage service to increase storage. The proxy signed message may then be sent to the service.

In another embodiment, the signing proxy system may be used to sign requests to a database service. For example, the client may be web-based control panel for a database. The service may be a database management system. The message may be a request using the HTTP protocol, asking for a clone of the database. The control panel may create an unsigned message and send the message to the storage service. A proxy service may intercept the unsigned message and determine its origin. If the message passes policy checks, such as the origin of the message is from a known IP address, then the proxy service may sign the unsigned message authorizing the database service to create a clone and send a proxy-signed message.

Figure 3:
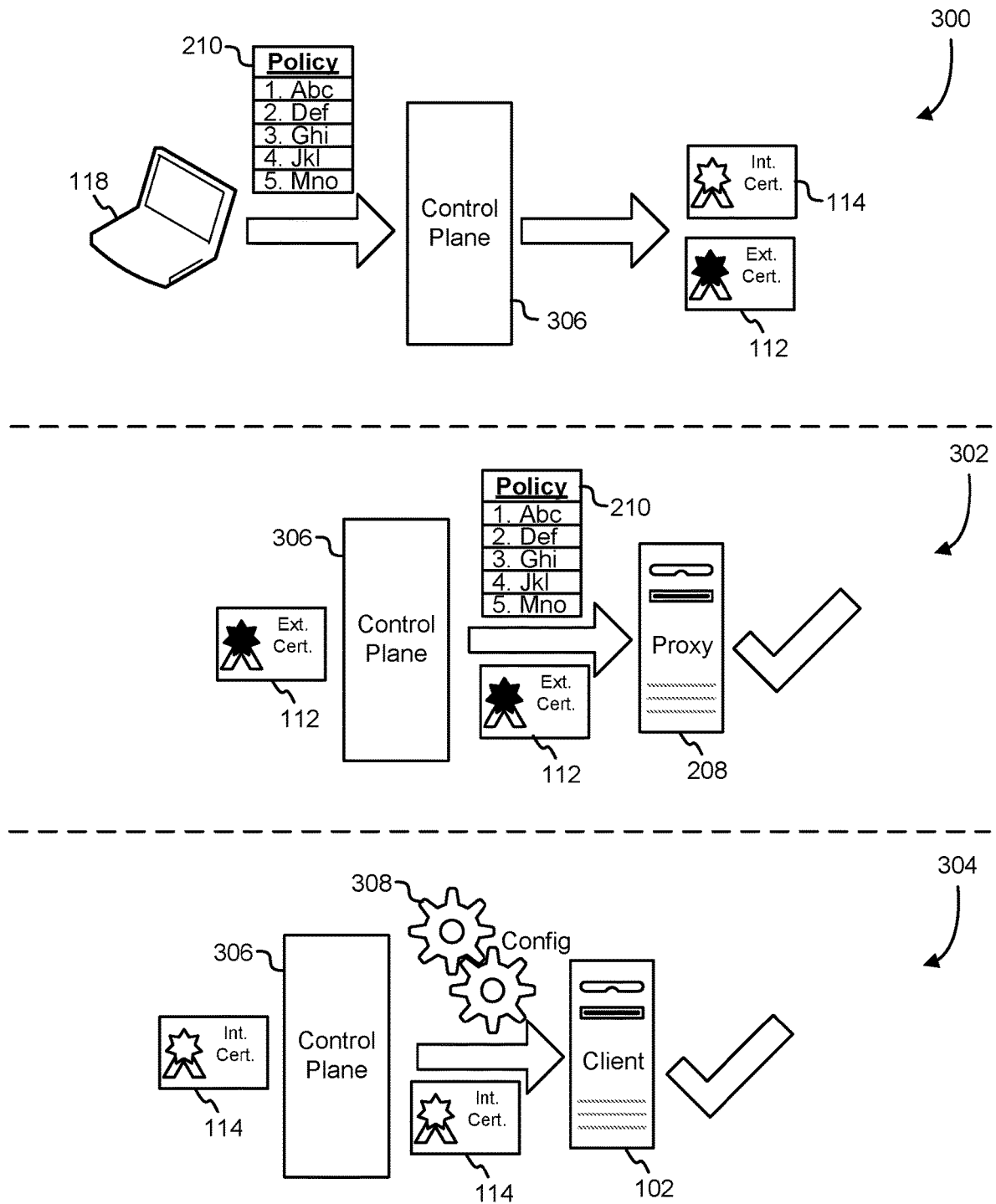
FIG. 3 shows an illustrative example of message flow during setup of a signing proxy in accordance with at least one embodiment.

Turning now to FIG. 3, a setup process for using a signing proxy system may be seen using an interim secret 114. The setup process has been divided into three operations in FIG. 3, a request operation 300, a proxy setup operation 302 and a client setup operation 304. In one embodiment the control plane may include a group of servers controlling the distribution of computing resources, including network resources. The proxy server 208 may be a server within a datacenter and the client may be a guest operating system managed by a hypervisor. In request operation 300, a user may use a user system, such as laptop 110, to contact a control plane 306 to request a setup of a signing proxy service. The user may specify policies that may be enforced by the service, including authentication, timing, origin, frequency, authorization and accounting controls. The control plane may associate two secrets, an interim secret for use by a client and a recognized secret for use by the proxy signing system. In some embodiments, the control plane may not create a recognized secret, but may choose to use a service provider secret instead. Thus, the proxy server may take an individually signed request by the client 102 using interim secret 114 and choose to sign the request with service-provider recognized secret 112. By using service provider secret, fewer user secret would have to be available. Similarly, changing of recognized secret could be handled more swiftly. In other embodiments a recognized secret may be created, with the interim secret serving as a placeholder for the recognized secret until signed by the proxy server 208. In some embodiments, only the recognized secret may be prepared, as messages between the client 102 and the proxy server 208 may be unsigned. In one embodiment, the secrets are credentials. In another embodiment, the secrets are certificates. Generally, the secret is any set of information that is not shared with the client.

In proxy setup operation 302, the control plane 306 may configure the proxy to use the recognized secret 112 and policy 210. The control plane may send the recognized secret to the proxy server 208 for use in signing policy approved client communications. In other embodiments, the proxy server 208 may be simply notified to associate a correct secret with the interim secret 114 of the client 102. The control plane 306 may also configure the proxy server 208 to use the policies 210 specified by the user during the request operation 300. The proxy server may then be configured to use one or more destinations, such as services, as end points for the signed client communications. In another embodiment, the proxy server may instead be configured to intercept signed client communications with one or more destinations. After which the proxy may sign and send the intercepted client communications to the original destinations, if the client communications satisfy policy.

In client setup operation 304, the client 102 may be configured to use an interim secret 114 and to send requests through a proxy server 208. The control plane 306 may send a client 102 interim secret 114 and configure the client networking to redirect requests for one or more services to the proxy server 208. In some embodiments, the secrets are given to a user to install on the client. In other embodiments, the secrets may be made available to the client by the control plane. After the client is given and/or has been altered to use the new configuration 308 presented by the control plane 306, the client may begin to use the signing proxy system.

In another embodiment of a client setup operation using unsigned messages instead of messages signed with interim secrets, the control plane may configure communications from the client to one or more services to pass through the proxy server 208. By routing the communications through the proxy server 208, the impact on client configuration may be minimal. For example, the client may not require configuration, as the configuration may be accomplished through the control plane setting up a router. In other embodiments, with the client being a guest operating system, the control plane may configure a hypervisor supporting the client 102 to route communications destined for a service to the proxy server 208. As there are no secrets to configure, the user impact may be smaller than use of interim secrets.

Figure 4:
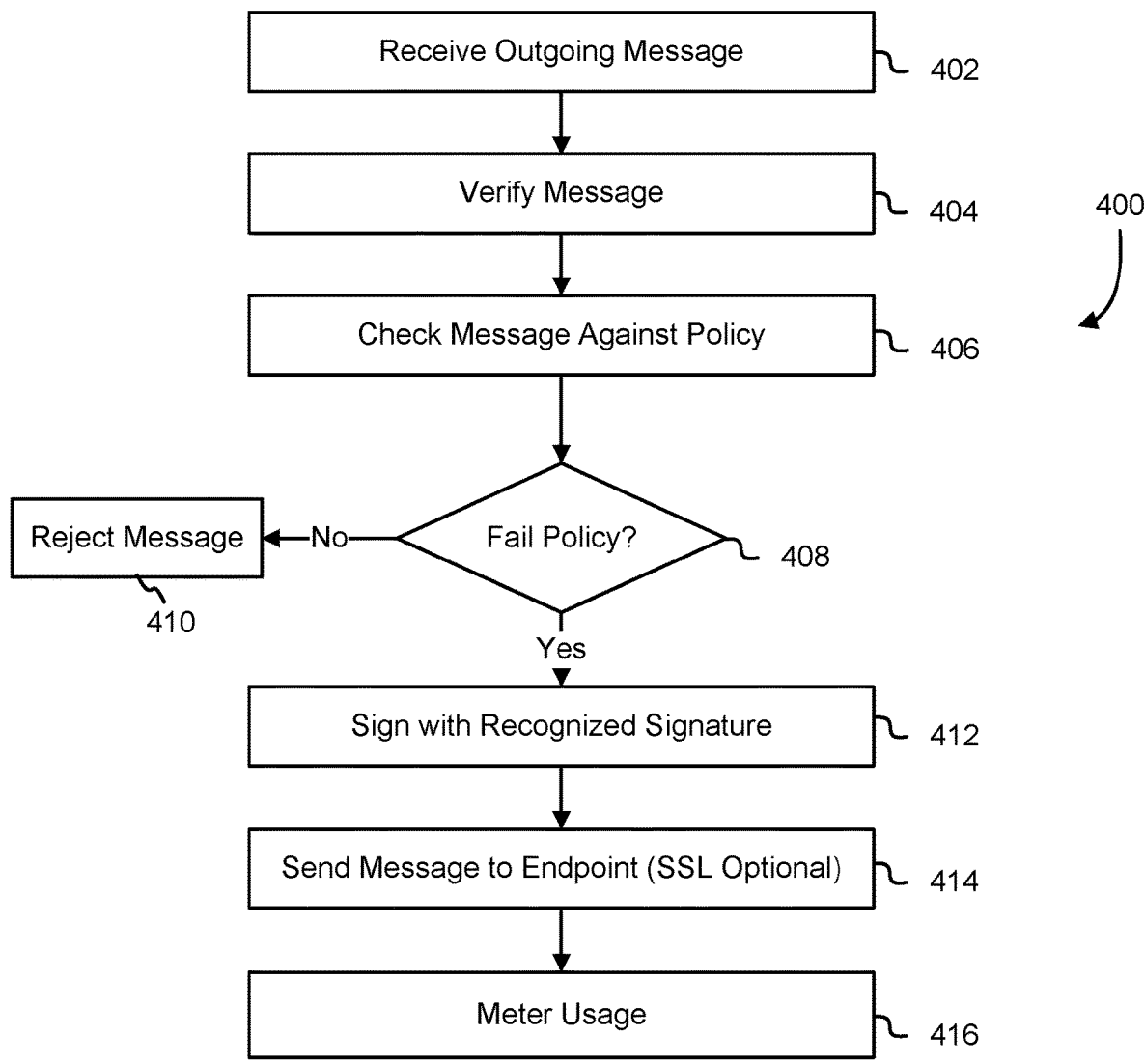
FIG. 4 shows an illustrative example of a process that may be used to perform proxy signatures in accordance with at least one embodiment.

Turning now to FIG. 4, a proxy signing process 400, in accordance with an embodiment, is illustrated. In one embodiment, such as seen in FIG. 2, a proxy server 208 may perform the proxy signing process 400 on a message received from a client computer 102. A signing proxy system may receive 402 a message from a client. The signing proxy may verify 404 the message as a message requiring a signature. In some embodiments, the message may be identified because it is signed with interim secrets. In some embodiments, the message may be unsigned, but the message destination may require signing. After verifying, the signing proxy system may check 406 the message against a policy to determine if the message should be signed. If the message fails 408 the policy check, the message may be rejected 410 and remain unsigned while the client notified of the problem. If the message passes 408 the policy check, the proxy service may sign 412 the message with a recognized signature. The proxy signed message may be sent 414 to the original destination or endpoint, using instructions from the policy. For example, the policy may require communications to the destination be over an SSL connection. The signing proxy system may then meter the usage of the signing proxy system.

Some or all of the process 400 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

Figure 5:
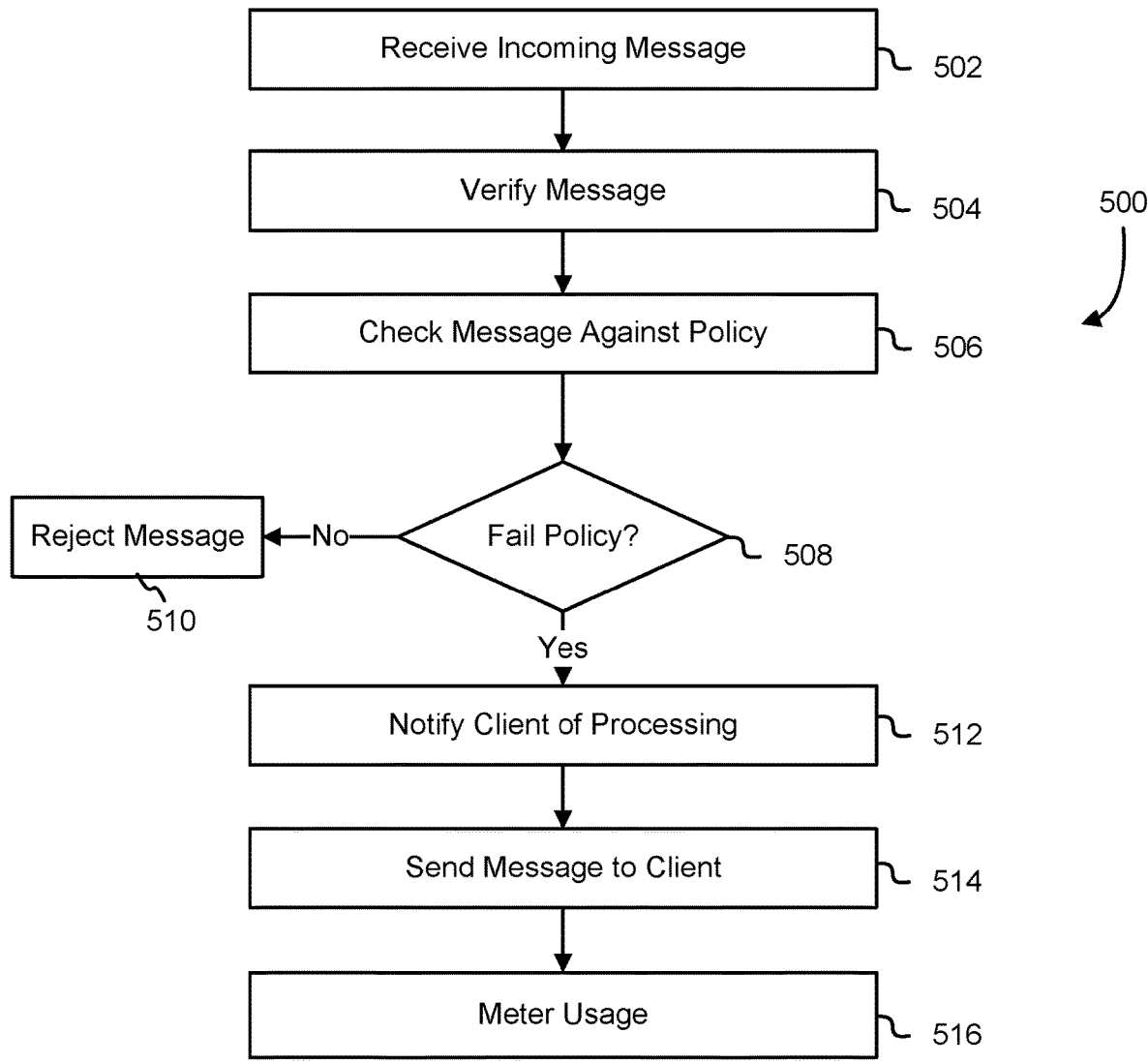
FIG. 5 shows an illustrative example of a process that may be used to receive messages through a signing proxy system in accordance with at least one embodiment.

Turning now to FIG. 5, a proxy receiving process 500, in accordance with an embodiment, is illustrated. In one embodiment, a proxy server, such as seen in FIG. 2, may perform the proxy receiving process 500 on a message received from a server forming part of a service. A signing proxy system may receive 502 a message from a service addressed to a client. The signing proxy may verify 504 the message as a message addressed to the client from the service, such as through a signature, address and/or secure channel. The incoming message may be processed 506 according to policy. In some embodiments, the policy may require decrypting the message and verifying the authenticity and integrity of the message. If the message fails 408, the message may be rejected 410 and remain unsigned. If the message passes 408 the policy check, the signing proxy system may optionally include 512 information in the message that the message had been processed by the signing proxy system. The message may then be sent 514 to the client and usage of the signing proxy system noted 516 for metering.

Figure 6:
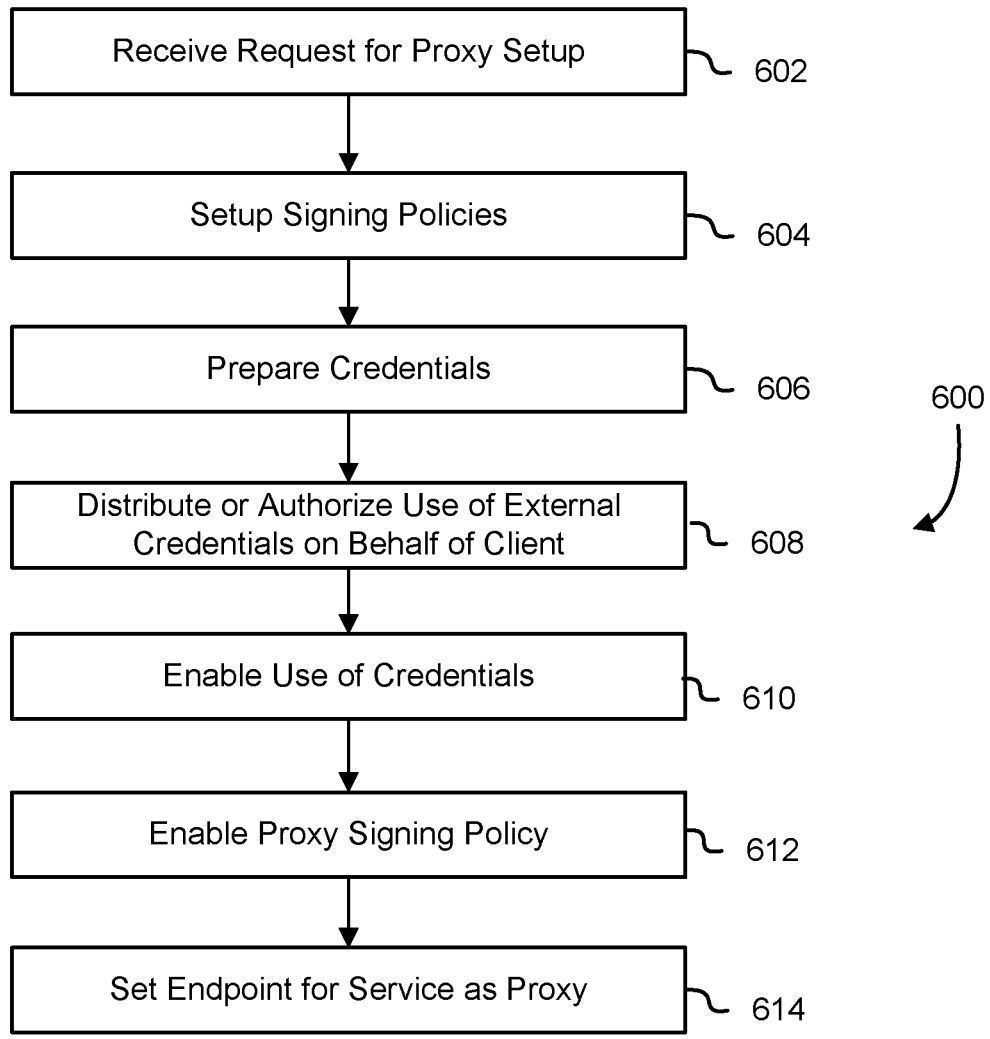
FIG. 6 shows an illustrative example of a process that may be used to setup proxy signatures in accordance with at least one embodiment.

Turning now to FIG. 6, a setup process 600 for a proxy signing system, in accordance with an embodiment, is illustrated. The setup process may be performed by a server, such as seen in FIG. 1, within a control plane with access to client computer configuration and a proxy server configuration. The control plane may receive 602 a request to setup a proxy signing system on behalf of a client. The control plane may also setup 604 a policy and/or a default policy with which to process signatures. The control plane may prepare 606 secrets to be used on behalf of the client. In some embodiments, this may be authorizing use of recognized service provider secrets. In other embodiments, it may be creating recognized client secrets for external use. In some embodiments, interim secrets may also be created for use by the client. Use of the prepared secrets may be enabled 610 through distribution of and/or authorization 608 to use the secrets. The signing proxy system may then be enabled 612 to act on behalf of the client. Routing may be set 614 that cause the signing proxy system to serve as an endpoint from the client to the service and from the service to the client.

While discussion has centered on signatures as the secret, the proxy may also recognize messages that take the form of secret exchange or authentication protocols. The proxy may intercept the recognized messages to cause resulting secrets to reside in the proxy rather than in the client. In one embodiment, the proxy might return and/or recognize client identifiers to trigger use of appropriate secrets. For example, a 3-legged Oauth exchange could be intercepted by a proxy and the secrets used to automatically sign Oauth-required outbound requests from the client. The proxy may also interact with other proxies before other clients to share session state or otherwise enable non-sticky load balancing. Non-sticky load balancing enables load balancing across multiple servers with a client, rather than between a specific server and the client.

Secrets may also be redacted or protected from receipt by the client as well. In one embodiment, sensitive information is removed from messages intercepted by the proxy and sent to the client. For example, credit card information may be detected by the proxy and removed from messages received by proxy on the way to the client. The credit card information can be used and/or stored by the proxy. In some embodiments, the credit card information is referenced in the message. The reference may be a token or encrypted version of information that is not accessible to the client, but may be referred to by the client. For example, the client can request that a token representing a credit card be charged by a service. The proxy may receive the token and substitute actual credit card information for the token and forward the request over a secure channel to the service.

Figure 7:
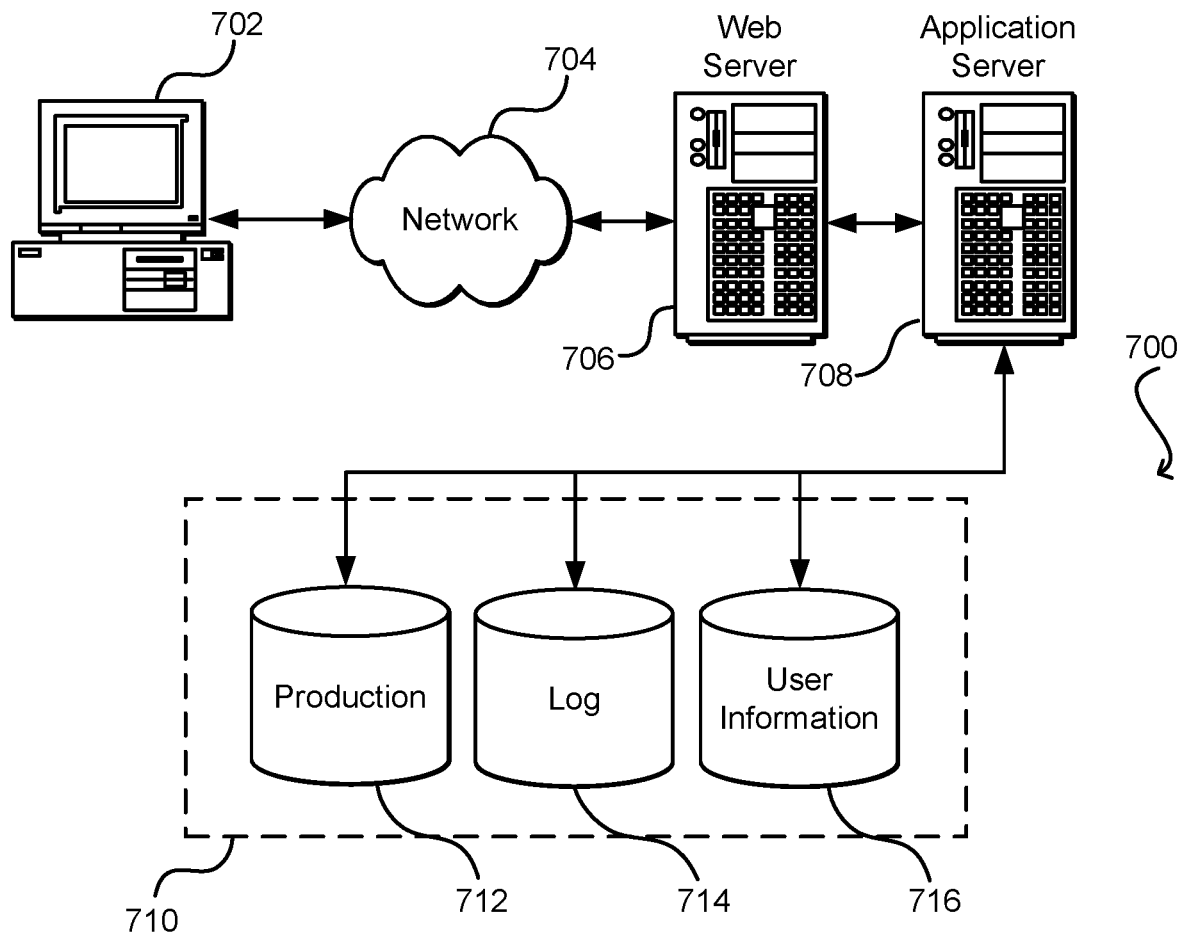
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases, or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer system for a security proxy, comprising:
one or more processors; and
a memory, including instructions executable by the one or more processors to cause the computer system to at least:
receive a signed message from a client by a secret holding service, the signed message including content, the content missing information based at least in part on a secret, the secret held by the secret holding service, unshared with the client and unavailable to the client;
determine whether to insert the missing information into the signed message based at least in part on a policy, the policy based at least in part on:
determining whether the client has access to a destination associated with the signed message; and
verifying that the signed message is signed with an interim credential;
form modified content based at least in part on the information and the signed message using the secret upon a determination that the signed message satisfies the policy; and
send the modified content to the destination upon the determination that the signed message satisfies the policy.

2. The computer system of claim 1, wherein sending the modified content further includes sending the modified content according to the policy, the policy specifying an outgoing protocol to use in sending the modified content, the outgoing protocol different from an incoming protocol used to receive the signed message by the computer system.

3. The computer system of claim 1, wherein the message is an API call.

4. The computer system of claim 1, wherein the instructions further cause the computer system to at least:
receive a token from the destination on behalf of a client;
store the token; and
use the token on behalf of requests from the client to access the destination.

5. The computer system of claim 1, wherein a proxy is positioned to process messages between the client and the destination, wherein receiving the signed message further comprises intercepting the signed message by the proxy.

6. The computer system of claim 1, wherein receiving the signed message from the client further includes receiving the signed message from a client, the signed message received over a trusted network, the trusted network segregated from other networks such that communications between the client and other computer resources within the trusted network have assurance that the communications are not altered.

7. The computer system of claim 1, wherein the client is a guest operating system and the instructions are performed on the same physical host.

8. One or more non-transitory computer readable storage media including collectively stored thereon executable instructions that, when executed by one or more processors of a computer system, cause the computer system to at least:
receive a signed message from a client by a secret holding service, the signed message including content, the content missing information based at least in part on a secret, the secret held by the secret holding service and unshared with the client and unavailable to the client;
determine whether to insert the missing information into the signed message based at least in part on a policy, the policy based at least in part on:
determining whether the client has access to a destination associated with the signed message; and
verifying that the signed message is signed with an interim credential;
form modified content based at least in part on the information and the signed message using the secret upon a determination that the signed message satisfies the policy; and
send the modified content to the destination upon the determination that the signed message satisfies the policy.

9. The one or more non-transitory computer readable storage media of claim 8, wherein sending the modified content includes recording the completion of the sending the modified content, the completion recording used in billing for the service.

10. The one or more non-transitory computer readable storage media of claim 8, wherein the signed message is an API call.

11. The one or more non-transitory computer readable storage media of claim 8, wherein the instructions further cause the computer system to at least:
receive a token from at least one of the destinations on behalf of a client from the one or more clients;
store the token; and
use the token on behalf of requests from the client to access the destination.

12. The one or more non-transitory computer readable storage media of claim 8, wherein the instructions further cause the computer system to at least negotiate a secure connection on behalf of the client to the destination; and wherein sending the modified content includes sending the content over a secure connection.

13. The one or more non-transitory computer readable storage media of claim 8, wherein the instructions further cause the computer system to at least:
receive a secure message addressed to the client from the destination;
decrypt the secure message on behalf of the client; and
send the decrypted message to the client.

14. The one or more non-transitory computer readable storage media of claim 8, wherein the instructions further cause the computer system to:
receive a different message addressed to the client from the destination;
remove sensitive information in the different message to form a modified message; and
send the modified message to the client.

15. The one or more non-transitory computer readable storage media of claim 8, wherein the instructions further cause the computer system to:

receive a different message addressed to the client from the destination;

replace sensitive information in the different message with a reference to the sensitive information to form a modified message; and send the modified message to the client.

16. A computer-implemented method, comprising:

receiving a signed message from a client by a secret holding service, the signed message including content, the content missing information based at least in part on a secret, the secret held by the secret holding service and unshared with the client and unavailable to the client;

determining whether to insert the missing information into the signed message based at least in part on a policy, the policy based at least in part on:

determining whether the client has access to a destination associated with the signed message; and verifying that the signed message is signed with an interim credential;

forming modified content based at least in part on the information and the message using the secret upon a determination that the signed message satisfies the policy; and sending the modified content to the destination upon the determination that the signed message satisfies the policy.

17. The computer-implemented method of claim 16, wherein sending the modified content includes recording the completion of the sending the modified content, the completion recording used in billing for the service.

18. The computer-implemented method of claim 16, wherein the signed message is an API call.

19. The computer-implemented method of claim 16, further comprising:

receiving a token from at least one of the destinations on behalf of a client from the one or more clients;

storing the token; and using the token on behalf of requests from the client to access the destination.

20. The computer-implemented method of claim 16, further comprising causing the computer system to at least negotiate a secure connection on behalf of the client to the destination; and wherein sending the modified content includes sending the content over a secure connection.

21. The computer-implemented method of claim 16, further comprising:

receiving a secure message addressed to the client from the destination;

decrypting the secure message on behalf of the client; and sending the decrypted message to the client.

* * * * *